March 14, 1944.  W. J. CATLETT, JR  2,343,883
AIR NAVIGATION PLOTTER
Filed Sept. 3, 1942
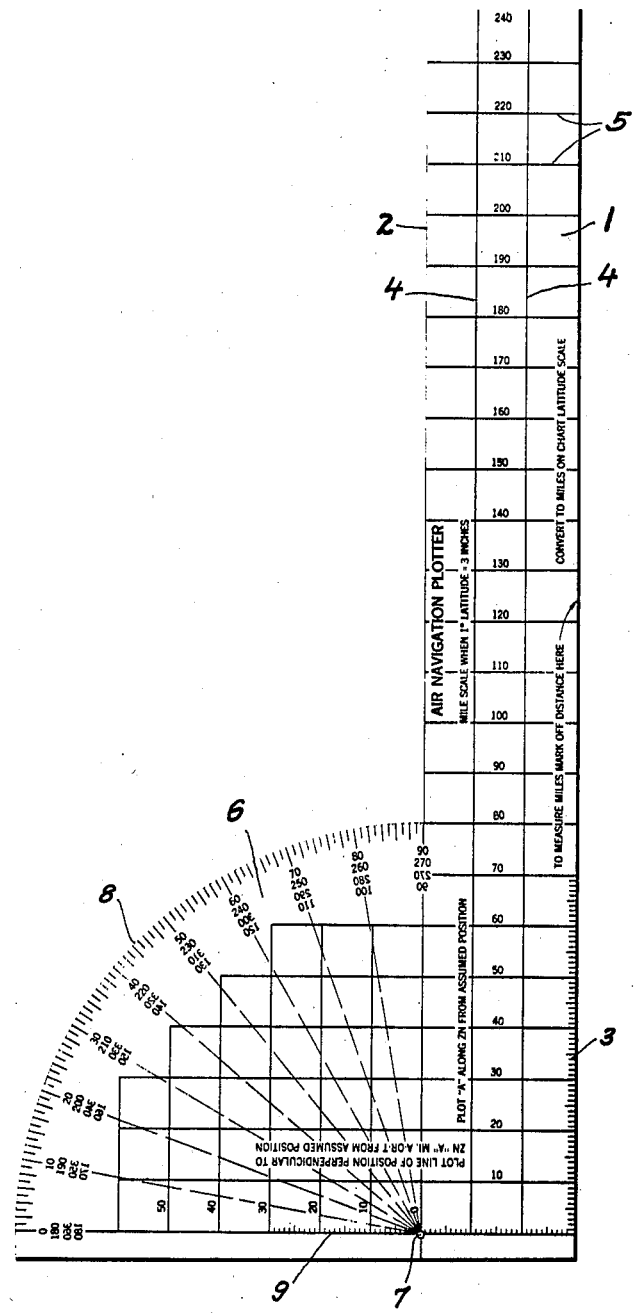
INVENTOR
WILLIAM J. CATLETT JR.
BY
ATTORNEY Patented Mar. 14, 1944

2,343,883

UNITED STATES PATENT OFFICE 2,343,883

AIR NAVIGATION PLOTTER

William J. Catlett, Jr., United States Navy

Application September 3, 1942, Serial No. 457,239

1 Claim. (Cl. 33—1)

(Granted under the act of March 3, 1883, as amended April 30, 1928; 370 O. G. 757)

This invention relates to a plotting instrument for use in navigation and more particularly in aerial navigation, and has certain advantages over the prior art which will be disclosed presently.

It is the object of this invention to provide a device of the type mentioned that is light, is of convenient size, can be inexpensively manufactured, and while being applicable to the solution of a large number of navigational problems, is particularly applicable to the problem of plotting lines of position determined from observations of a celestial body.

With the above and other objects in view, the invention consists in the construction, combination and arrangement of parts as will be hereinafter more fully described.

The drawing shows the form of the invention that is at present preferred.

The subject device is preferably made of transparent Celluloid or the like and comprises a blade 1 having one longitudinal edge calibrated with a scale 3 representing nautical miles, in which the unit as shown is 20 miles to the inch, which is convenient for use in conjunction with usual aircraft plotting sheets as these also have a scale of 1 degree of latitude equal to three inches. Scale 3 has its commencement on a transverse line a short distance from the lateral edge of rectangular blade 1. Scale 3 is marked by equidistant transverse lines 5 across the blade, and by numerals, every ten miles of representation. A portion of its length, near its commencement, also has markings every mile of representation. A series of equidistant longitudinal lines 4, also spaced half an inch apart, form a grid for drawing parallel lines.

A quadrantal protractor 6 is formed by a projection of the material of the rectangular blade from the edge 2 opposite scale 3 adjacent to the end where that scale commences. The center of the quadrant is located on the transverse line marking the commencement of scale 3, in line with the edge 2. At this center is a hole 7 through which a pencil point may be inserted. The protractor has on it an angle scale 8, 90 degrees in length, extending from the edge 2 of the blade 1. The 0 degree mark of scale 8 lies on the extension of the transverse line of the rectangular blade which marks the commencement of scale 3, which line also contains hole 7. The 90 degree mark lies clockwise around the scale where the protractor projection joins the edge 2 of the rectangular blade 1. Scale 8 is marked at every degree and numbered at ten degree intervals. Under the numerals between "0" and "90" are placed those between "180" and "270," also running clockwise. Under the numerals "180" to "270" are placed those between "270" and "360" and below these those between "90" and "180," both the latter series running counter-clockwise, however, and engraved in reverse so as to be legible when the device is turned on the opposite side than that from the remainder of the scales are legible.

Broken lines are engraved connecting each series of numerals at the 10 degree positions of scale 8 with the hole 7 at the center. The transverse lines 5 adjacent to the protractor are extended thereon and crossed to form a continuation of the grid by a continuation of the series of longitudinal lines 4. Scale 9 is marked along the extension of the transverse line of the rectangular blade which marks the commencement of scale 3, the scale commencing at hole 7 and running towards the arc of the protractor, with markings every mile of representation for a portion of its length and numerals every 10 miles of representation.

Practically all the methods of celo-navigation, by means of observations of celestial bodies, used in aerial navigation, and the great majority of the methods used in surface navigation, involve assuming a position on the earth's surface in order to establish the third vertex of a spherical triangle on the celestial sphere having as its two other vertices the elevated celestial pole and the observed astronomical body. The third vertex is the point on the celestial sphere directly above the assumed position, the zenith. From a latitude and longitude of the assumed position, the exact time of the observation, and the position on the celestial sphere of the observed body at this exact time, sufficient dimensions of the astronomical triangle are known to permit its solution for the unknown part by means of a number of formulae, some having more convenience than others. The unknown parts desired are those which determine the altitude, or angular distance of the observed body above the celestial horizon, and the azimuth, or angle of direction of the body measured clockwise from true north. When the altitude has been determined from computation in this manner it is compared with the altitude obtained by sextant observation after the latter has been corrected for optical and other variations which cause it to differ from the actual angular distance of the observed body from the celestial horizon.

At any instant of time there are a number of positions on the earth's surface from which the corrected observed altitude of a celestial body will be the same. These positions all lie on a circle on the earth's surface, which circle is large enough, except in latitudes near the poles, that a portion of its length, of the order of the difference between the actual position and that which can be assumed with usual methods of dead reckoning, will closely approximate a straight line which has a direction at right angles to the azimuth of the observed body. Thus should the computed altitude using the assumed position equal the corrected observed altitude the navigator will know he is on a line of position passing through the assumed position and at right angles to the azimuth of the observed body. From a position a few miles from such a line the corrected observed altitude would differ from the altitude computed by using an assumed position by the same number of minutes of arc as the difference in nautical miles between the actual position and this line. If the corrected observed altitude is greater than the computed altitude the actual position is towards the observed body from the assumed position, and if less it is away. Thus, should the corrected observed altitude differ from the computed altitude the navigator may plot his line of position by measuring a distance towards or away from the assumed position, in the direction of the azimuth of the observed body, equal to the difference between the observed and computed altitudes, and drawing his line of position through the point thus obtained at right angles to the azimuth. It is to facilitate this plotting that the present invention is particularly adapted.

Having determined the azimuth and the difference between the computed and the corrected observed altitudes, or the altitude intercept, with this invention the navigator places the plotter on the plotting sheet or chart so that scale 8 will represent the quadrant in which the azimuth is located. If the azimuth is greater than 270 degrees or less than 90 degrees this will be with the 0 degrees mark of scale 8 towards the northerly direction as represented on the plotting sheet or chart. If the azimuth is between 90 degrees and 270 degrees this will be with the 180 degrees mark of scale 8 towards the southerly direction. The face of the plotter must be up on which the numerals of the appropriate quadrant are legible, rather than reversed. The navigator then places hole 7 over the assumed position and turns the instrument so the longitudinal lines 4 of the grid are parallel to the latitude, and the transverse lines 5 are parallel to the longitude lines of the chart or plotting sheet, using his pencil point placed through hole 7 to facilitate this positioning. A mark placed on the plotting sheet or chart opposite the azimuth as indicated on scale 8 serves to establish the line of bearing of the celestial body. The plotter is now placed with the edge of blade 1 at the initial point of scale 3 on the assumed position, the edge lying in the line of bearing of the observed body just established, and a distance equal to the altitude intercept is marked off on the chart or plotting sheet. When a chart or universal plotting sheet with scale of 1 degree latitude equals 3 inches is used scale 3 can be used directly; otherwise it will be necessary to utilize the chart scale to convert the altitude intercept to distance on the plotting sheet or chart. By now placing the plotter so hole 7 is over the foot of the altitude intercept and turning the plotter so one end of scale 8 lies in the line of bearing of the observed body, a mark on the plotting sheet or chart opposite the other end of scale 8 will determine the line of position through the altitude intercept which can be drawn by placing the edge of blade 1 on the line just determined.

It is thus apparent that with the use of this invention lines of position may be rapidly and accurately plotted in a more convenient manner than by the use of a drafting machine, parallel rulers, plotter requiring clamping and unclamping of a movable arm, determination of a reciprocal azimuths as would be necessary almost one-fourth of the time when using the device of U. S. Patent 1,985,907, or other devices known to the prior art.

It will be understood that the above description and accompanying drawing comprehend only the general and preferred embodiment of my invention and that various changes in construction, proportion and arrangement of parts may be made within the scope of the appended claim without sacrificing any of the advantages of my invention.

The invention described herein may be manufactured and used by or for the Government of the United States of America for governmental purposes without the payment of any royalties thereon or therefor.

I claim:

A transparent integral navigational plotting instrument comprising a rectangular rule portion substantially 12 inches long having a quadricircular portion with one radial edge along a long edge of the rectangular portion, the other radial edge being flush with the end portion thereof and a narrow rectangular strip portion along this end and the said other radial edge, a pencil point perforation being made at the juncture of the three portions, the instrument having rectangular grid lines at half inch intervals, forming scales longitudinally and transversely of the instrument originating at the lines intersecting at the perforation, the grid lines being marked numerically with 10 unit intervals in the numerals, the first few spaces between the grid lines along the outer edges of the grid markings being subdivided into 10 divisions in each space, the arcuate edge of the quadricircular portion being divided into a one degree scale, every 10 degree division being connected by a light radial line with the perforation, and the degree scale being marked at the 10 degree intervals by four sets of numerals, two covering the 90 degree ranges from 0 to 90 and 180 to 270 and running in a clockwise direction, the other two covering the 90 to 180 and 270 to 360 ranges and running in a counter-clockwise direction, the latter two sets being engraved in reverse so as to be legible from the opposite side of the instrument.

WILLIAM J. CATLETT, Jr.